Aug. 7, 1934.  E. R. ELLIOTT  1,968,998
CORN COMBINE
Filed July 17, 1933  2 Sheets-Sheet 1

INVENTOR.
EDISON R. ELLIOTT
BY James A. Walsh
ATTORNEY

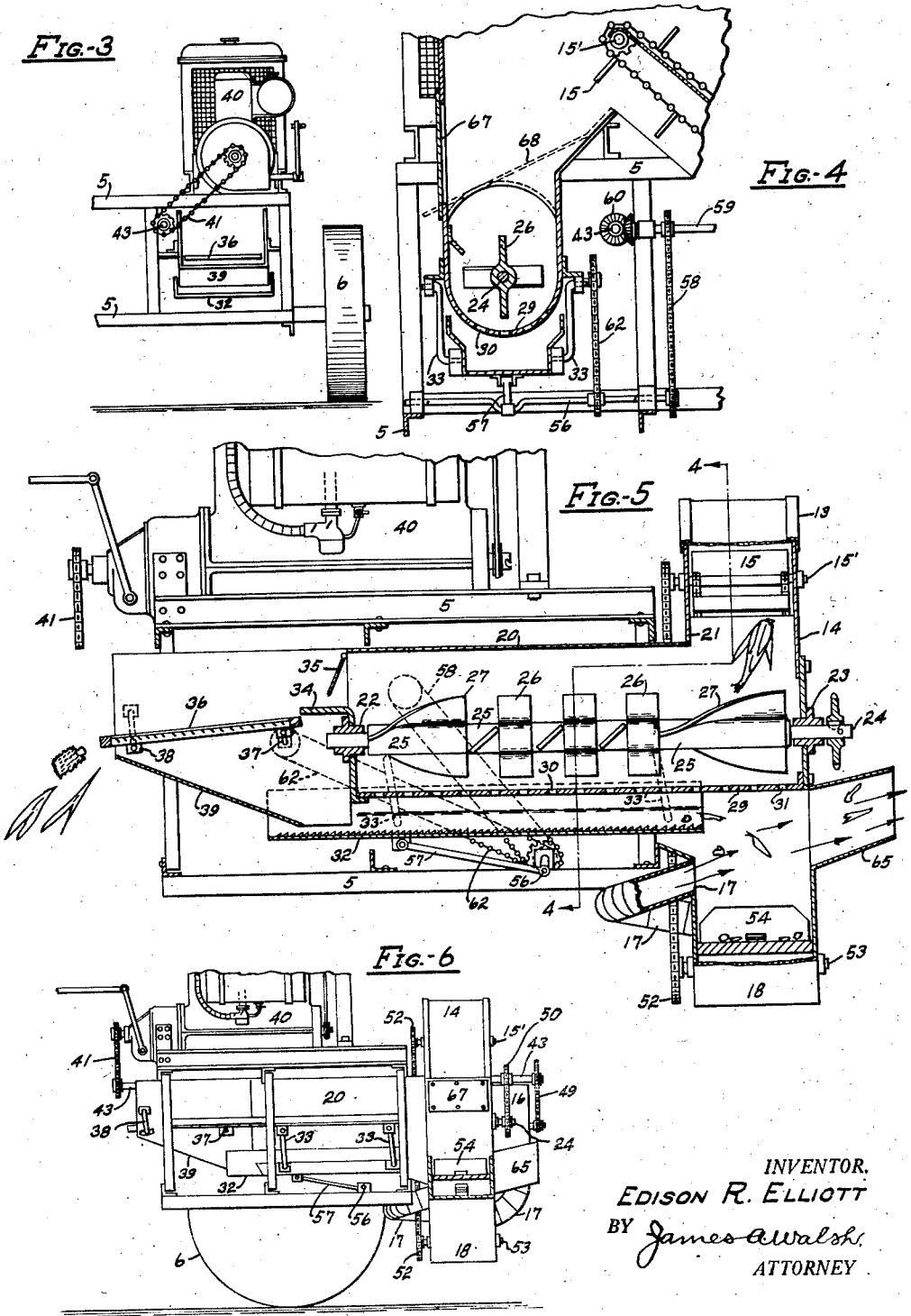

Patented Aug. 7, 1934

1,968,998

UNITED STATES PATENT OFFICE

1,968,998

CORN COMBINE

Edison R. Elliott, Rochelle, Ill.

Application July 17, 1933, Serial No. 680,712

11 Claims. (Cl. 56—18)

In harvesting corn by means of portable pickers, conditions at times are such that the corn may be shelled immediately when ears are picked from the stalks so that it becomes unnecessary to both husk and remove ear corn from the field during harvesting operations to be stored and later shelled, as is common practice, and therefore it is the object of my invention to provide an improved corn combine so constructed and operated that sufficiently matured ear corn can be shelled as the machine progresses through the field and the work of gathering the crop is, therefore, not only expedited but the expense of other operations requiring further treatment and rehandling is avoided.

Figure 1:
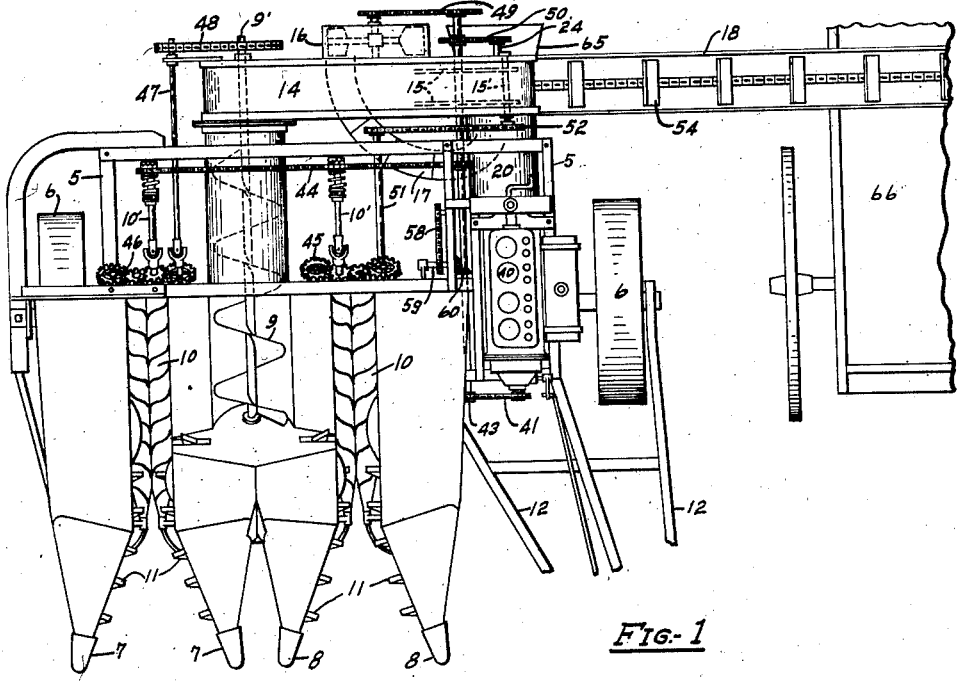
Figure 2:
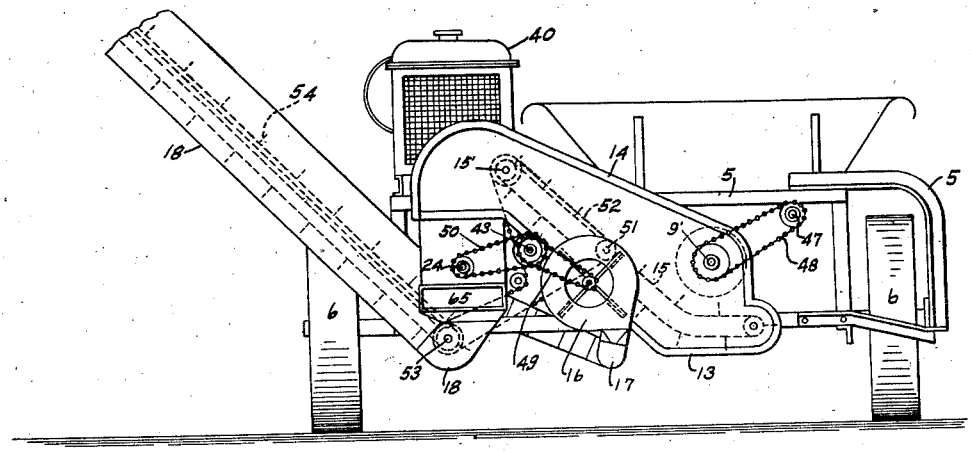

In the accompanying drawings, forming part hereof, Figure 1 is a plan view of a corn combine including my improvements; Fig. 2, a rear elevation; Fig. 3, a fragmentary front elevation showing the relation of the motor for operating the machine and the sheller beneath it; Fig. 4, a detail section taken on the dotted line 4—4 in Fig. 5; Fig. 5, a detail side elevation partly in section of the sheller element; and Fig. 6 is a side elevation of the sheller forming part of the machine.

In said drawings the numeral 5 indicates the frame of the machine supported by wheels 6, upon which frame gathering points 7, 8, are mounted and between which points a conveyor 9 is positioned for removing material coming from the rolls 10 advanced thereto by the toothed chains 11, a draw-bar 12 being adjustably secured to the frame and adapted to be attached to a tractor (not shown) for transporting the machine; and, as the parts referred to are of common and well known construction and arrangement, they need be referred to but generally in describing my improvements.

The elevator 9 delivers the husked ears and trash into a conveyor 13 comprising a housing 14 and an endless carrier 15 and mounted on the rear end of the frame 5 as indicated in Figs. 1 and 2. A winnowing fan 16 is supported on the housing 14 and has a blast discharging outlet 17 leading therefrom and so terminating as indicated in Fig. 5 to force a blast transversely across the lower portion of a wagon loader 18 for a purpose to appear.

Mounted upon one side of the frame 5 is a sheller comprising a casing 20 communicating, at 21, with the conveyor 13, and in the casing, at 22, and the conveyor housing 14, at 23, a shaft 24 is secured, upon which shaft sleeves 25 are mounted carrying shelling and propelling blades 26, 27, respectively. The floor 29 of the sheller is preferably curved, Fig. 4, and is perforated as at 30, 31, and extends from the forward end of the sheller casing to the conveyor housing 14. Beneath said floor is a trough-like reciprocating pan 32 having a corrugated or stepped floor suspended from the machine frame by hangers 33, 33', an apron 34 being projected through the casing forwardly of the propeller, an adjustable damper or gate 35 above said apron being supported by the sheller casing, and which apron leads to a perforated shaking platform 36 mounted on crankshaft 37 and supported at 38 above an inclined floor 39 communicating with the shaking pan 32.

In my present construction, as illustrated, I install a motor 40 on the frame of the machine above the sheller for actuating the operating elements of the combine, but desire to be understood as not limiting myself to such arrangement as it is obvious that I may employ a tractor power take-off shaft or other driving means for my purpose. In using a motor, I connect thereto by a sprocket and chain system 41 or otherwise, main drive shaft 43 extending rearwardly between the sheller and a gathering point 8 and projecting beyond the conveyor 13 to which shaft and the roll shafts 10' a sprocket and chain system 44 is connected for actuating said rolls and the gathering chains 11 associated therewith by the gear systems 45, 46, in the well known manner, and by which means the elevator shaft 9' is actuated through its drive shaft 47 connected thereto by the sprocket and chain system 48. The fan 16 is driven from the main shaft 43 by the drive 49, as is also the sheller shaft 24 by the drive 50, Fig. 2, while the carrier 15 is driven by the shaft 51 through suitable gearing (not shown) associated with the gear system 45 and a chain 52, connecting the conveyor shaft 15' and the shaft 53 of the wagon loader carrier 54 and by which the latter is actuated. As stated, the shaking pan 32 is suspended by the hangers 33, 33' and for actuating the same a crank shaft 56 supported in the sheller frame is connected to the shaft by a pitman 57, which shaft is actuated by a sprocket and chain system 58 connecting the crank shaft to a jack shaft 59 mounted on the frame 5 and driven by the main drive shaft 43 through the transmission gears at 60, Figs. 1 and 4. The crank shaft 56 is also utilized for actuating the shaking platform 36 by means of the sprocket and chain system 62 connecting said shaft to the crank shaft 37 as will be understood.

In the operation of my improved corn combine, the machine is drawn through a field of standing corn, the gathering points including the chains 11 and rolls 10 passing astride the stalks and snapping the ears therefrom in a manner well known, which ears with husks and trash are propelled by the elevator 9 into the conveyor 13 which moves the material across the rear of the machine and delivers it into the sheller casing 20, loose kernels mingled with the material passing through the floor 29, at 31, while the ears, husks and stalk bits are propelled forwardly and the ears shelled by the blades 26, 27, the kernels passing through the floor at 30 into the shaking pan 32. The damper 35 is adjusted to retard and control the flowing mass of cobs and trash to such extent as to receive a thorough treatment by the shelling and propelling blades so that as the material moves over the apron 34 and onto the platform 36 it will be sufficiently loosened and spread out that any loose kernels through the agitation of the platform will pass through the openings therein onto the inclined floor 39 and discharged therefrom into the shaking pan 32, while the trash, including the whole and broken cobs, will discharge forwardly to the ground as indicated in Fig. 5. During this action the shelled kernels and finer trash will be propelled rearwardly by the stepped reciprocating pan and with the lose kernels passing through the floor at 31 fall into the blast discharging from the fan outlet 17 by which the material is winnowed so that the trash will escape through the chute 65 while the cleaned shelled kernels will be conveyed by the wagon loader 18 to a source of deposit, as a wagon 66, to be transported for storage or immediate shipment as desired. If it is preferred to not shell the corn in the field in the manner described, I provide simple means for intercepting the husked ears as they discharge through the conveyor 13 so that they will not enter the sheller but pass directly into the wagon loader. For this purpose a closure 67, Fig. 6, is provided in the discharge end of the conveyor 13 and by removing which an inclined deflector 68, Fig. 4, may be inserted over the propeller blades to produce a by-pass thereover, so that as the material discharges from the carrier 15 it will pass along the deflector and directly into the wagon loader, in which manner the husked ears will be elevated into a vehicle for removal to the cribs as is common. It will be understood, therefore, that with my improved machine the corn may be shelled immediately as the ears are picked, or simply picked in the manner stated to be later shelled as desired.

I claim as my invention:

1. In a machine of the class described, the combination, with a wheeled frame, of means for gathering standing corn stalks, means for removing the ears therefrom, means for conveying the ears and other material from said removing means, means communicating with said conveying means for receiving and discharging material conveyed thereby, means for intercepting the material discharging from said receiving means, means including said intercepting means for removing and separating the kernels from ears in said material and propelling treated material from said intercepting means, and means for receiving the separated kernels and discharging the same independently from said treated material.

2. In a machine of the class described, the combination, with a wheeled frame, of means for gathering standing corn stalks, means for removing the ears therefrom, means for conveying the ears and other material from said removing means, means communicating with said conveying means for receiving and discharging material conveyed thereby, means for intercepting the material discharging from said receiving means, means including said intercepting means for removing and separating the kernels from ears in said material and propelling treated material from said intercepting means, means for receiving the separated kernels and discharging the same independently from said treated material, and means for simultaneously actuating the various means specified.

3. In a machine of the class described, the combination, with a wheeled frame, of means for gathering standing corn stalks, means for removing the ears therefrom, means for conveying the ears and other material from said removing means, means communicating with said conveying means for receiving and discharging material conveyed thereby, means for intercepting the material discharging from said receiving means, means including said intercepting means for removing and separating the kernels from ears in said material and propelling treated material from said intercepting means, means for receiving the separated kernels and discharging the same independently from said treated material, and means for winnowing the separated kernels as they are being discharged.

4. In a machine of the class described, the combination, with a wheeled frame, of means for gathering standing corn stalks, means for removing the ears therefrom, means for conveying the ears and other materials from said removing means, means communicating with said conveying means for receiving and discharging material conveyed thereby, means for intercepting the material discharging from said receiving means, means including said intercepting means for removing and separating the kernels from ears in said material and propelling treated material from said intercepting means, means for receiving the separated kernels and discharging the same independently from said treated material, means for winnowing the separated kernels as they are being discharged, and means for simultaneously actuating the various means specified.

5. In a machine of the class described, the combination with a wheeled frame, of means for gathering corn stalks, means for removing the ears therefrom, means for conveying the ears and other material from said removing means, means communicating with said conveying means for receiving and discharging material conveyed thereby, a compartment including a perforated floor into which the discharging material is delivered, means in said compartment for separating kernels from ears of corn whereby the kernels pass through the perforated floor and other material is propelled from the compartment, agitating means upon which the material is deposited for separating kernels therefrom, reciprocating means beneath the perforated floor for receiving shelled kernels and discharging the same separately from other material, and means for simultaneously actuating said several means.

6. In a machine of the class described, the combination with a wheeled frame, of means for gathering corn stalks, means for removing the ears therefrom, means for conveying the ears and other material from said removing means, means communicating with said conveying means for receiving and discharging material conveyed thereby, a compartment including a perforated floor into which the discharging material is delivered, means in said compartment for separating kernels from ears of corn whereby the kernels pass through the perforated floor and other material is propelled from the compartment, agitating means upon which the material is deposited for separating kernels therefrom, reciprocating means beneath the perforated floor for receiving shelled kernels and discharging the same separately from other material, means for winnowing the loose kernels as they are being discharged, and means for simultaneously actuating said several means.

7. In a machine of the class described, the combination, with a wheeled frame, of means for gathering standing corn stalks, means for removing ears from the stalks, means for conveying the ears and other material from said removing means, means communicating with said conveying means for receiving and discharging material conveyed thereby, means for intercepting the material discharging from said receiving means, means including said intercepting means for removing and separating the kernels from ears in said material and propelling treated material from said intercepting means, means for receiving the separated kernels and discharging the same independently from said treated material, means for winnowing the separated kernels as they are being discharged, means for conveying the winnowed material from the machine, and means for conveying cleaned kernels to a source of deposit.

8. In a machine of the class described, the combination, with a wheeled frame, of means for gathering corn stalks, means for removing the ears therefrom, means for conveying the ears and other material from said removing means, means arranged transversely of the frame and communicating with said conveying means for receiving and discharging material conveyed thereby, means positioned in parallel relation to the gathering means and communicating with said conveying means for receiving and shelling the ears, and means associated with the shelling means for receiving and discharging kernels separated by said shelling means.

9. In a machine of the class described, the combination, with a wheeled frame, of stalk gathering means, means for removing the ears therefrom, means for conveying material from the removing means, means for shelling the ears positioned in parallel relation to the gathering means, means for delivering cobs and trash from one end of the shelling means, means for separating shelled kernels from other material, and means for discharging the kernels in a direction opposite to the other material.

10. In a machine of the class described, the combination, with a wheeled frame, of stalk gathering means, means for removing ears from the stalks, means for conveying material from the removing means, means communicating with said conveying means for intercepting material and separating the kernels from ears in said material, means for receiving the separated kernels and discharging the same, and means communicating with said conveying means for diverting material from the intercepting means to be discharged from the machine with the ears unshelled.

11. In a machine of the class described, the combination, with a wheeled frame, of stalk gathering means, means for removing ears from the stalks, means for conveying material from the removing means, means communicating with said conveying means for intercepting material discharging therefrom and shelling the ears therein, means for receiving the shelled corn and discharging the same, and a by-pass in advance of the intercepting means for diverting material therefrom to be discharged from the machine with the ears unshelled.

EDISON R. ELLIOTT.